United States Patent
Tschantz et al.

(10) Patent No.: US 9,176,017 B2
(45) Date of Patent: Nov. 3, 2015

(54) INFLATION PROBE DEVICE WITH MEASUREMENT OF INFLATION PRESSURE

(76) Inventors: Michell C. Tschantz, Newtown, CT (US); Kerry M. McKinley, Newtown, CT (US)

( * ) Notice: Subject to any disclaimer, the term of this patent is extended or adjusted under 35 U.S.C. 154(b) by 251 days.

(21) Appl. No.: 13/490,980

(22) Filed: Jun. 7, 2012

(65) Prior Publication Data

US 2013/0139601 A1      Jun. 6, 2013

Related U.S. Application Data

(60) Provisional application No. 61/520,348, filed on Jun. 7, 2011.

(51) Int. Cl.
  *G01L 7/00*    (2006.01)
  *B31D 5/00*    (2006.01)
  *B05B 1/20*    (2006.01)
  *B05B 1/00*    (2006.01)

(52) U.S. Cl.
  CPC . *G01L 7/00* (2013.01); *B05B 1/005* (2013.01); *B05B 1/20* (2013.01); *B31D 5/0073* (2013.01)

(58) Field of Classification Search
  None
  See application file for complete search history.

(56) References Cited

U.S. PATENT DOCUMENTS 5,878,774 A * 3/1999 Zanetti ................. 137/228

* cited by examiner

*Primary Examiner* — Lisa Caputo
*Assistant Examiner* — Brandi N Hopkins
(74) *Attorney, Agent, or Firm* — Ware, Fressola, Maguire & Barber LLP

(57) ABSTRACT

An inflation device for airbags has an inflation tube insertable through the airbag inflation valve, the inflation tube having a distal end. A handle mounts the inflation tube and is connected to an inflation gas source. A delivery valve controls inflation gas flow through inflation tube. A pressure gauge has an input and conduit extending therefrom along the inflation tube and to the end of the inflation tube for ascertaining inflation pressure within the airbag. The delivery valve is operated to achieve a desired inflation pressure. The inflation tube has gas delivery openings through its side walls laterally delivering inflation gas to the airbag. The inflation tube and pressure gauge conduit are inserted together through the airbag inflation valve, so that inflation pressure is monitored substantially concurrently with inflation.

8 Claims, 6 Drawing Sheets

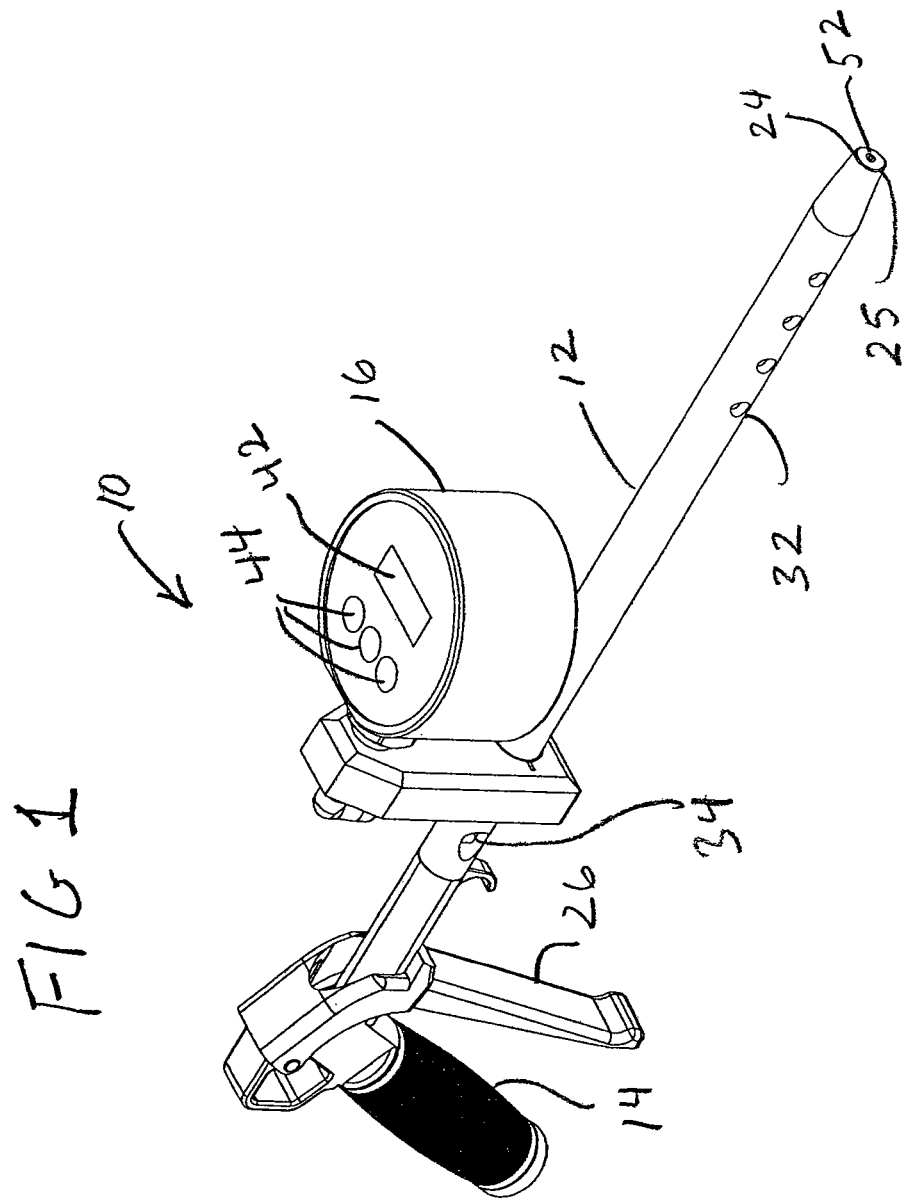

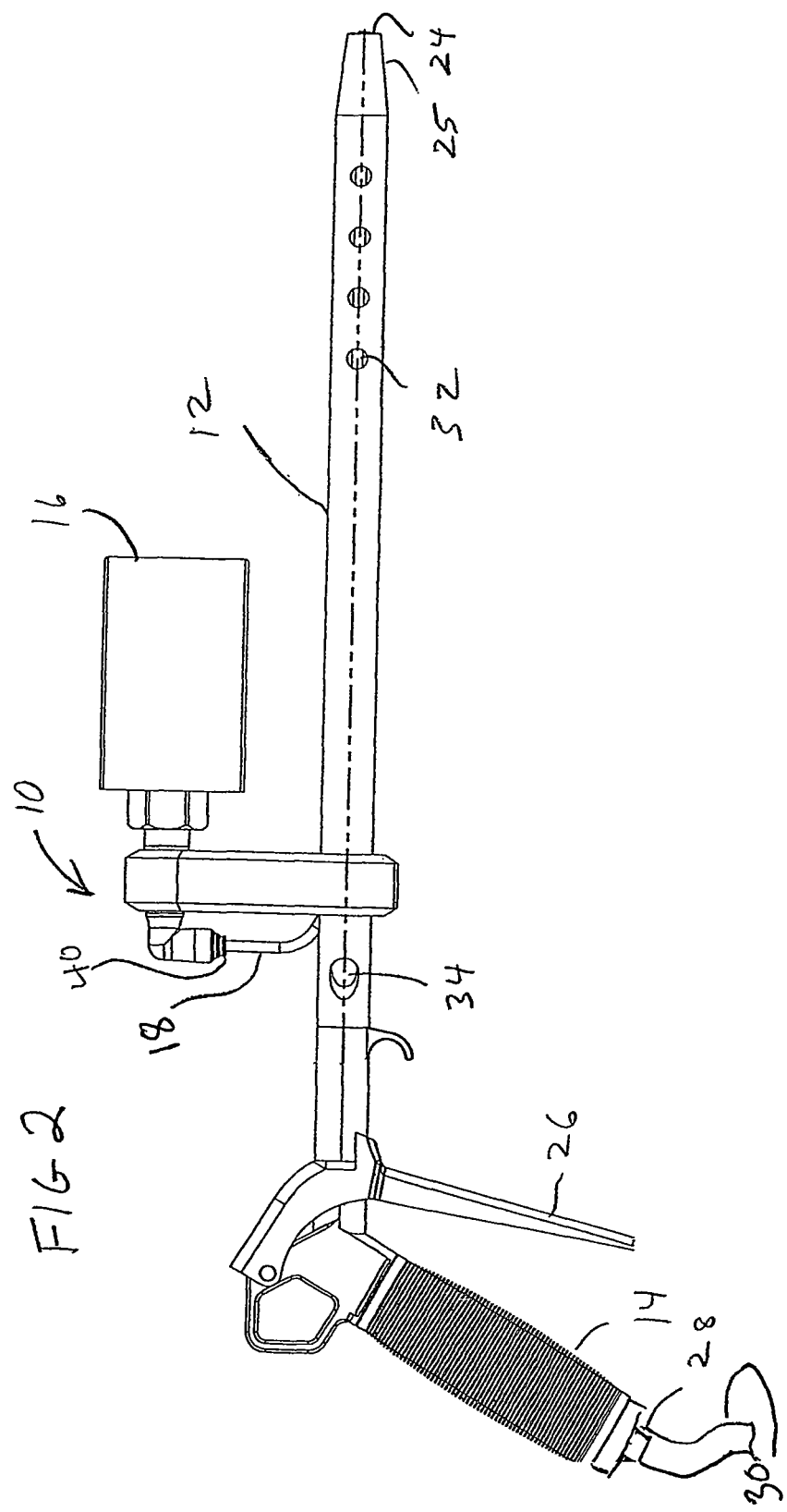

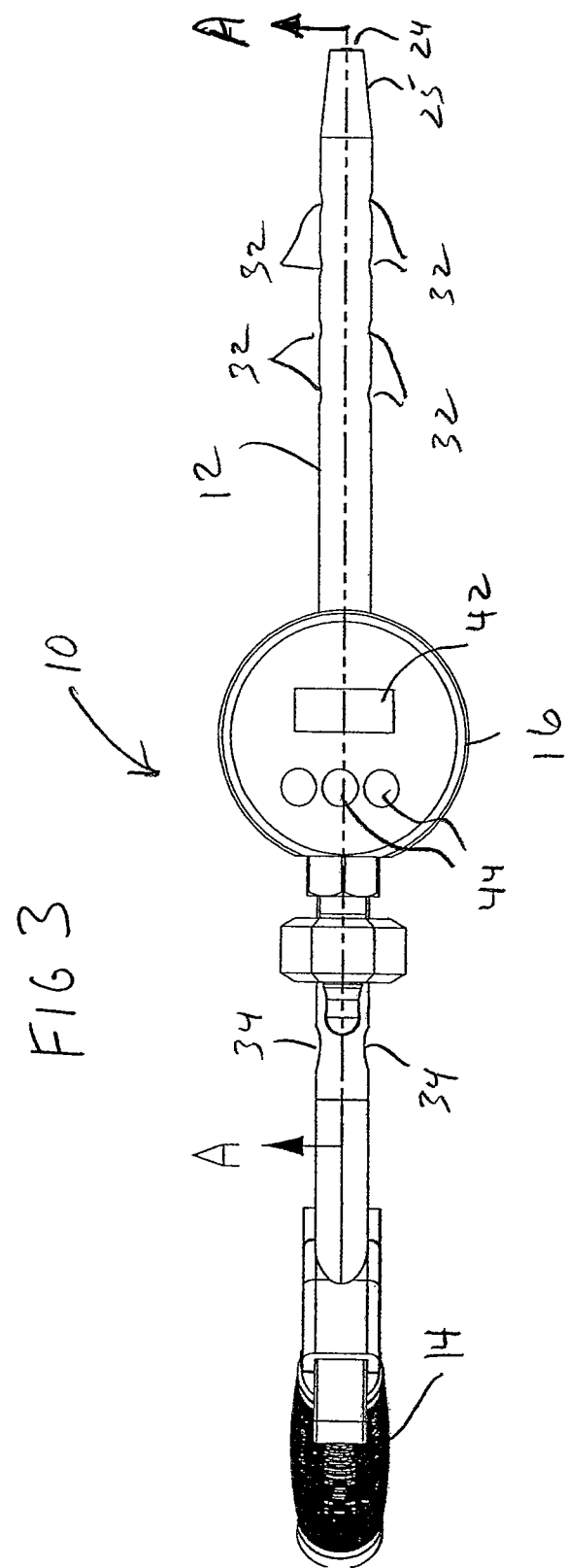

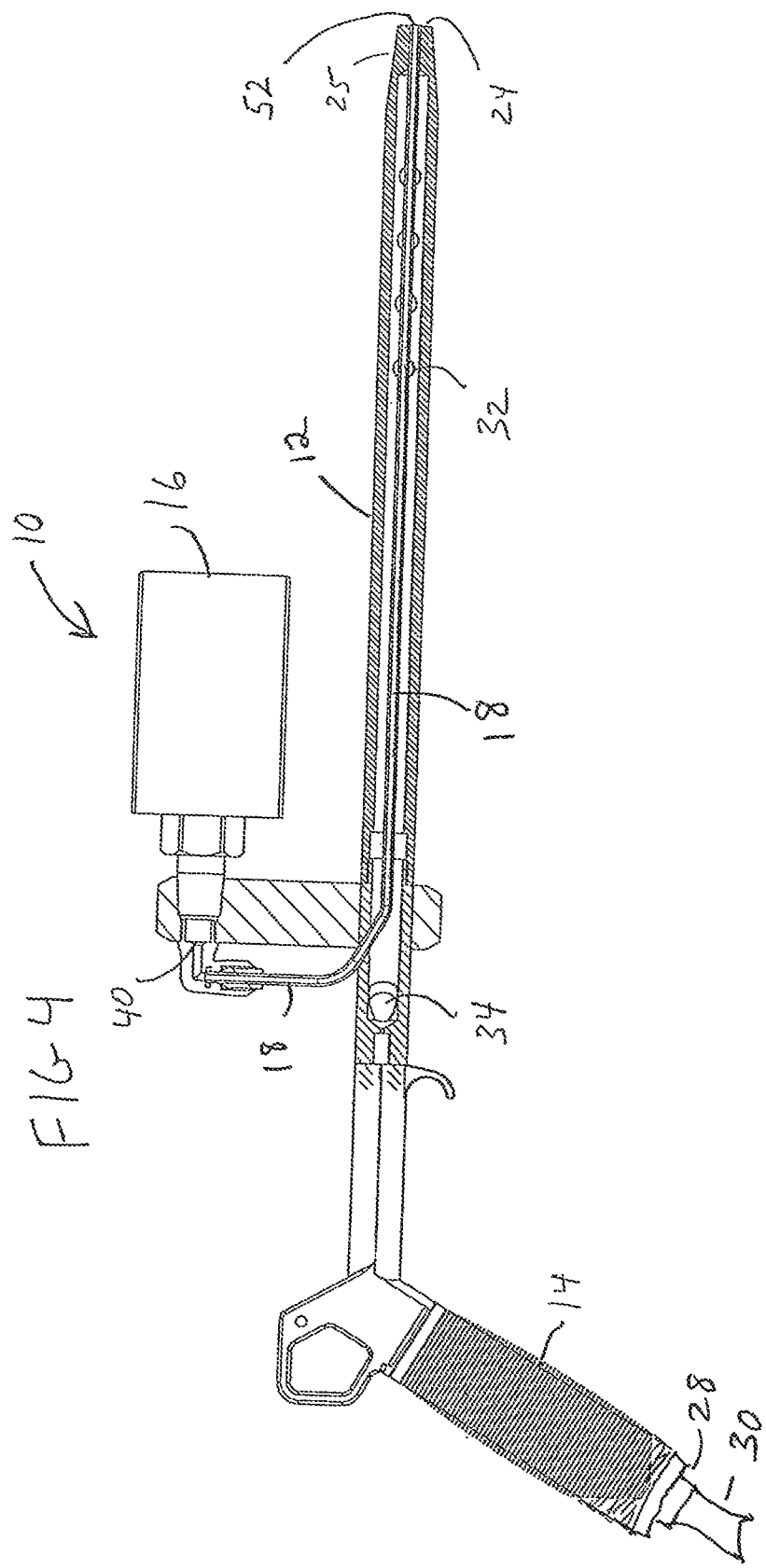

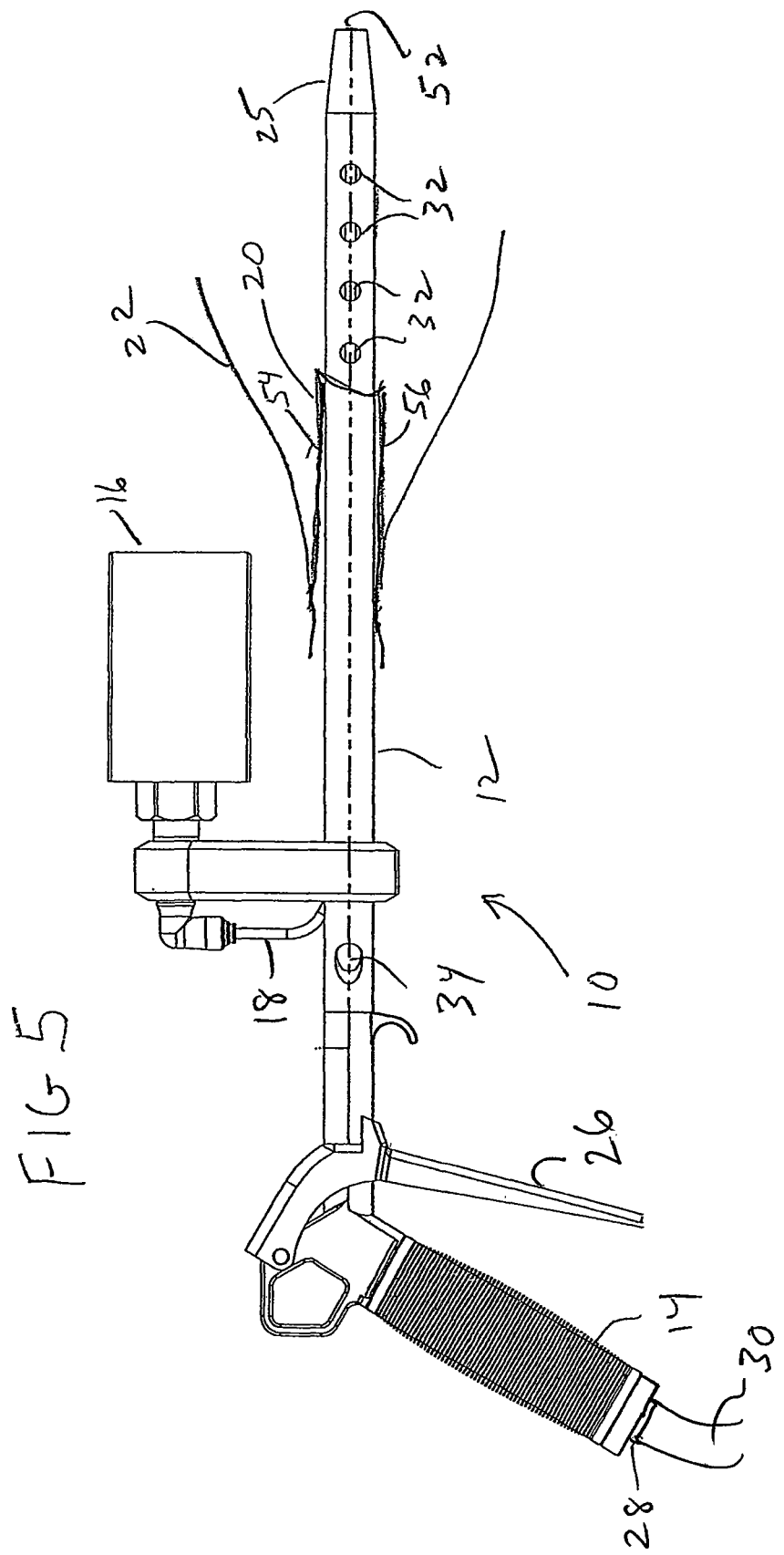

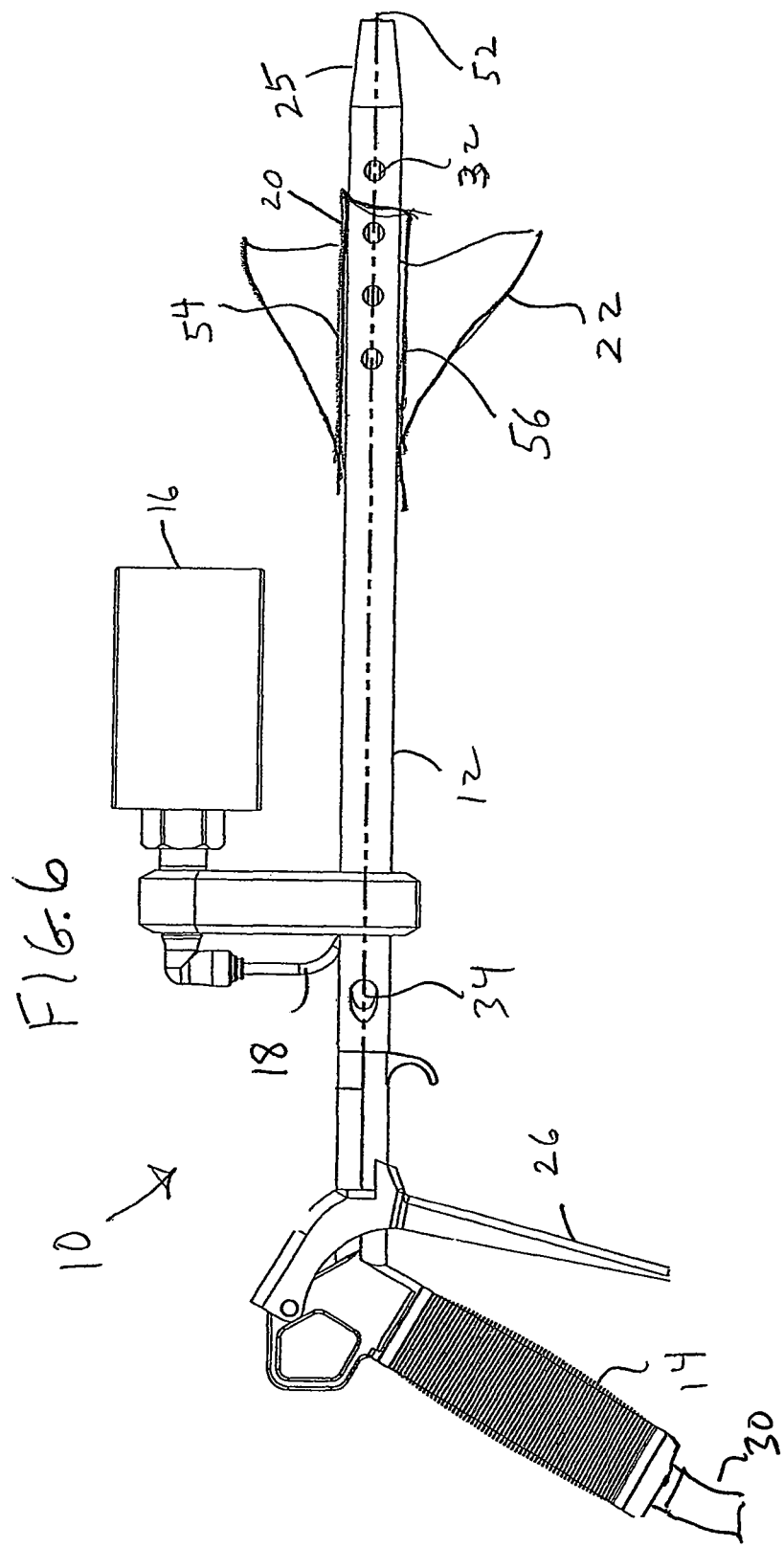

INFLATION PROBE DEVICE WITH MEASUREMENT OF INFLATION PRESSURE

RELATED APPLICATION

This application claims priority to our U.S. Provisional Application Ser. No. 61/520,348 filed Jun. 7, 2011.

FIELD OF THE INVENTION

The invention herein relates to an inflation probe device providing measurement of the inflation pressure at the time of inflating airbags, particularly when inflating large dunnage bags to highly accurate inflation pressure, and a method of inflating airbags to highly accurate inflation pressure.

BACKGROUND OF THE INVENTION

Inflatable packaging cushions, or airbags, have become well known for cushioning packages and products during shipment. Some airbags are positioned inside a package to provide cushioning of a product within the package and to fill voids between the product and the walls of the package. These are generally smaller airbags, but may in some instances be of considerable size.

Dunnage bags are large volume airbags used to fill voids and secure packages in shipping spaces, such as in trucks, railroad cars, aircraft and shipping containers. Dunnage bags are often positioned between adjacent pallets each containing multiple product packages, and between such pallets and the walls of the shipping spaces.

Airbags may encounter changes in ambient pressure during shipment, the most pronounced effect being due to changes in altitude. For instance, freight aircraft are generally pressurized to the normalized atmospheric pressure at 7500 feet, and trucks and railroad cars may encounter altitude changes of 5000 or more feet in transit routes from sea level across mountains.

At the higher altitudes, there is a decrease in the ambient pressure exerted on the exterior of the airbags, and the increased differential between the external ambient pressure and inflation pressure of the airbags that was set at a lower altitude causes the airbags to expand.

In the case of small volume, well supported airbags acting on sturdy packaging and products, this is generally not a problem, but particular packaging and products may require careful and accurate adjustment of inflation pressure. However, larger volume airbags and particularly dunnage bags have a correspondingly larger increase in dimension which can damage adjacent packaging or the products therein. If the airbag is inside a package, it can expand and deform the package from the inside. In the case of dunnage bags, the expanded dunnage bags can compress and deform the packaging of adjacent products by pushing the package walls inwardly.

A particular example of this problem is in the shipment of flat screen televisions. The packaging carton is designed to surround and protect the perimeter of the flat screen televisions, and to support the flat screen televisions on that perimeter packaging. However, there is no cushioning between the screen of the flat screen television and the outside carton, which therefore consists of a large unsupported panel of cardboard spaced from the screen. This avoids contact between the packaging and the screen, which thereby also avoids possible scratching or pressure damage to the screen. However, when multiple cartons of flat screen televisions are placed on pallets and loaded into shipping containers and the pallets are spaced and secured by inflated dunnage bags, the dunnage bags are in contact with the outside panels of some of the cartons. If the dunnage bags expand too greatly in transit, the panels of the cartons are crushed inwardly. Although actual damage to the flat screen televisions may be avoided because of the spacing provided by the cartons, the flat screen televisions are no longer saleable as an A-stock product and have to be sold as B-stock or "open box" product at a reduced prices and substantial loss of profit. In a worse case example, the flat screen television is actually damaged and cannot be sold at all.

A desired inflation pressure based on the highest anticipated altitude change during shipment of the product can be calculated. In the case of a dunnage bag being used in the shipment of products that will encounter a 5000 foot increase in altitude change, the desired inflation pressure may be on the order of 0.06 PSI, and initial inflation pressure of 0.8-1.0 PSI or above may cause considerable damage when the shipment reaches its highest altitude. It is very difficult for a worker to estimate the correct inflation pressure based on the appearance and feel of the dunnage bag as the dunnage bag is being inflated, and it is also very difficult to measure and adjust the inflation pressure during inflation with currently available equipment and methods.

Accordingly, it would be a substantial advance in the art if the inflation pressure of airbags, and particularly dunnage bags, could be accurately and efficiently established at the time of inflation.

SUMMARY OF THE INVENTION

It is a principal object of the invention herein to provide for accurate inflation of airbags, and particularly large volume airbags, such as dunnage bags.

It is a further object of the invention herein to provide for the accurate inflation of airbags in an efficient manner including rapid inflation of the airbag and quick measurement and adjustment of inflation pressure.

It is also an object of the invention herein to provide for the accurate inflation of airbags that is easily accomplished.

It is an additional object of the invention herein to provide for the accurate inflation of dunnage bags during the loading of shipping containers.

In carrying out the invention herein, an inflation device is provided having an inflation tube with a distal end adapted for inflation gas delivery through the inflation valve of an airbag. The inflation tube is mounted extending from a handle and is adapted for connection to a source of pressurized inflation gas. A delivery valve controls the flow of pressurized inflation gas through the inflation tube to the airbag. A pressure gauge has an input orifice and a pressure gauge conduit extending from the input orifice to adjacent the distal end of the inflation tube, wherein the distal end of the pressure gauge conduit is exposed to and is in pressure communication with the internal pressure of the airbag when the inflation tube is inserted through the inflation value of the airbag. The inflation gas delivery valve may be operated to achieve inflation pressure in the airbag and the inflation pressure in the airbag is monitored by the pressure gauge and used to achieve the desired inflation pressure gas delivery.

In further aspects of the invention, the inflation valve is mounted to the handle and is manually operated by a trigger mounted to the exterior of the handle. The pressure gauge is mounted to one of the inflation tube or handle.

In further aspects of the invention, the inflation valve of the airbag is the type that receives a tubular inflation probe and the inflation tube is a tubular inflation probe adapted for insertion through the inflation valve to the interior of the airbag. In preferred aspects of the invention, the inflation probe has gas delivery openings through the sidewall thereof and the distal end of the pressure gauge conduit is at or near the tip of the inflation probe. The pressure gauge conduit may extend through an end wall of the inflation probe.

In additional aspects of the invention, the inflation tube has venturis for increasing the volume of inflation gas delivered to the airbag, and the venturis bleed pressure from the airbag when the inflation gas delivery valve is closed. This permits bleeding pressure from the airbag to a desired inflation pressure.

The invention is also carried out by measuring the internal inflation pressure of airbags substantially concurrently with inflating the airbags, and providing a desired inflation pressure. The desired inflation pressure may be selected to adapt the airbag for shipment through varying ambient pressure conditions.

Other objects and features of the invention will in part be apparent to those skilled in the art, and will in part appear in the following detailed description of the invention and the claims, taken together with the drawings.

BRIEF DESCRIPTION OF THE DRAWINGS

FIG. 1 is a perspective view of an inflation device according to the invention herein;

FIG. 2 is a side elevation view of the inflation device of FIG. 1;

FIG. 3 is a top view of the inflation device of FIG. 1;

FIG. 4 is a sectional view of the inflation device of FIG. 1, taken along the lines A-A of FIG. 3;

FIG. 5 is a side elevation view of the inflation device of FIG. 1; inserted through the inflation valve of an airbag; and FIG. 6 is a side elevation view of the inflation device of FIG. 1, partially withdrawn from the airbag with respect to the position of the inflation device shown in FIG. 5.

The same reference numerals refer to the same elements throughout the various figures.

DETAILED DESCRIPTION OF THE INVENTION

With reference to FIGS. 1-4, an inflation device 10 according to the invention herein is illustrated. The inflation device 10 generally comprises an inflation tube 12, a handle 14, and a pressure gauge 16 having a pressure gauge conduit 18.

The inflation tube 12 is in the form of a substantially rigid elongated tubular inflation probe adapted for insertion through an inflation valve 20 of an airbag 22, as shown in FIG. 5. The inflation tube 12 has end wall 24 at the distal end 25 thereof. The distal end 25 and endwall 24 may be generally conical to facilitate insertion through the inflation valve 20. The other end of the inflation tube 12 is mounted to the handle 14 which has an internal inflation gas delivery valve, not shown but well-known in the art and further referenced below. The inflation gas delivery valve is manually operable by a trigger 26 in the form of a lever pivotly mounted to the exterior of the handle 14. The handle 14 has a connector 28 for connection with a conduit 30 delivering pressurized inflation gas to the inflation device 10. Therefore, operation of trigger 26 permits inflation gas to flow through the handle 14 and into the inflation tube 12. The trigger 26 may also be in the form of a push button or other actuator, and the delivery valve may also be solenoid or otherwise controlled if desired. The operation of the delivery valve may also be automated rather than manual.

The handle 14 incorporating a manually operable inflation gas delivery valve and operation trigger lever 26 is commercially available from Coil Hose Pneumatics, model number-TYP-2500-CS. Other handles including valves and valve operation levers or the like are also available.

Inflation tube 12 is provided with a plurality of inflation gas openings 32 spaced apart along the length of the inflation tube 12, relatively near the distal end 25 thereof. Thus, inflation gas is delivered laterally from the inflation tube 12 through the inflation gas openings 32.

The inflation tube 12 is also provided with a pair of venturis 34 near the handle 14. These venturis 34 draw in air during high flow of the pressurized inflation gas, thereby increasing the volume of inflation gas delivered to the airbag. The venturis 34 lose their effectiveness for this purpose as the inflation pressure increases, i.e. when flow is decreased due to attained higher pressure in the airbag, but the venturis are effective to aid rapid inflation on initial filling of high volume airbags, such as dunnage bags.

The inflation device 10 mounts the pressure gauge 16 above the inflation tube 12. The pressure gauge 16 has an inlet orifice at 40, seen in FIG. 4, and has a readout screen 42. A plurality of controls 44 turn the pressure gauge off and on, change the scale thereof, calibrate the initial reading of the pressure gauge to 0, and such usual functions. A suitable pressure gauge is available from SSI Technologies, Inc., model number MG-5A-av-R. It operates in the rage from 0-5 PSI. Other ranges are available for other applications.

The pressure gauge conduit 18 extends from the pressure gauge input orifice 40 into the inflation tube 12, and extends within the inflation tube 12 to an open distal end 52 thereof. In the preferred embodiment shown, the distal end 52 of the pressure gauge conduit 18 extends through the end wall 24 of the inflation tube 12, and the open distal end 52 of the pressure gauge conduit 18 is exposed adjacent the distal end 25 of the inflation tube 12.

With reference to FIG. 5, the inflation device 10 is used by inserting the inflation tube 12 through an inflation valve 20 of an airbag 22. The inflation valve 20 is of the type having two layers 54, 56 of thermoplastic material that may be separated to admit the inflation tube 12 for delivering inflation gas, and that self-seal upon removal of the inflation probe 12. As shown in FIG. 5, the inflation tube 12 is inserted so that all of the laterally-deployed gas delivery openings 32 deliver inflation gas to the interior of the airbag 22, and the open distal end 52 of the pressure gauge conduit 18 is exposed within the airbag 22. The trigger 26 is operated to admit pressurized inflation gas to the interior of the airbag 22, and the pressure gauge 16 reads the pressure within the airbag 22, as communicated from the open distal end 52 by the pressure gauge conduit 18. Delivery of the inflation gas from the laterally-deployed openings 32 minimizes any effect of the pressurized inflation gas input on the open distal end 52 of the pressure gauge conduit 18, thereby avoiding false or fluctuating readings.

It is typical to slightly over inflate the airbag 22, in part because of difficulty of cutting off the flow of inflation gas at the precise desired inflation pressure and in part because it is easy to make final adjustment of the inflation the pressure by bleeding excess inflation gas from the airbag. This bleeding occurs through the venturis 34 once the inflation gas delivery valve is closed. When the inflation pressure is at the desired level, the inflation tube 12 is withdrawn and the inflation valve 20 seals the airbag 22.

FIG. 6 illustrates a useful technique that takes advantage of the configuration of the inflation device 10 for precision adjustment of the inflation pressure. In FIG. 6, the inflation tube 12 has been partially withdrawn through the inflation valve 20, so that only the inflation openings 32 closest to the distal end 25 of the inflation tube 12 are exposed within the airbag 22. This decreases the rate of bleeding excess inflation gas from the interior of the airbag 22 through the venturis 34, making it simpler to withdraw the inflation probe 12 when the pressure gauge 16 reads at the desired inflation pressure. This is an added advantage of having a plurality of openings 32 along the length of the inflation tube 12, for laterally delivering the inflation gas.

The inflation pressures for a large dunnage bag in anticipation of a 5000 ft. elevation change may be very low, e.g. 0.06 PSI. These pressures are sufficiently low that the sensing the inflation pressure must be very accurate. The inflation device 20 achieves this by sensing the inflation pressure within the airbag, and at a point separated from the pressure of the inflation gas, either when being delivered or when being bled to the desired inflation pressure.

The foregoing also illustrates a method of inflating airbags, in which an inflation tube and input to a pressure gauge are inserted together through an inflation value of an airbag. The inflation pressure within the airbag is monitored substantially concurrently with inflating the airbag while both the inflation tube and input to the pressure gauge are inserted within the airbag, and the inflation take and input to the pressure gauge are withdrawn together from the airbag when the desired inflation pressure is attained.

Accordingly, an inflation device and method of inflating airbags have been described which admirably achieves the objects of the invention herein. It will be appreciated that the inflation device illustrated and described above is an illustrative embodiment of the invention, and that various changes may be made by those skilled in the art without departing from the spirit and scope of the invention, which is set forth in the following claims.

We claim:

1. An inflation device for airbags the type having an inflation valve, comprising:
    A) an inflation tube adapted for delivering inflation gas through the inflation valve of an airbag and delivering inflation gas into the airbag; the inflation tube having a distal end;
    B) a handle mounting the inflation tube extending therefrom to its distal end, the handle adapted for connection to a source of pressurized inflation gas;
    C) a delivery valve controlling the flow of pressurized inflation gas to and through the inflation tube, and operable between an open position and a closed position, wherein in the open position the delivery valve is configured to allow the flow of pressurized inflation gas from the source to and through the inflation tube;
    D) a pressure gauge with an input orifice; and
    E) a pressure gauge conduit extending from the input orifice of the pressure gauge along the inflation tube and terminating in a distal end of the pressure gauge conduit at or adjacent to the distal end of the inflation tube, wherein the distal end of the pressure gauge conduit is exposed to and is in pressure communication with the inflation pressure within the airbag and transmits that inflation pressure to the pressure gauge at least when the delivery valve is in the open position and pressurized inflation gas is allowed to flow from the source to and through the inflation tube;
    whereby the delivery valve may be operated to achieve a desired inflation pressure of the airbag as indicated on the pressure gauge.

2. An inflation device as defined in claim 1 wherein the inflation valve of the airbag is of the type that receives a probe and the inflation tube is an elongated tubular probe adapted for insertion through the inflation valve.

3. An inflation device as defined in claim 2 wherein the inflation tube has gas delivery openings through the side wall thereof for laterally delivering pressurized inflation gas to the interior of the airbag, and the distal end of the pressure gauge conduit is near the distal end of the inflation tube.

4. An inflation device as defined in claim 3 wherein the pressure gauge conduit extends along the interior of the inflation tube and through an end wall of the inflation tube, with the distal end of the pressure gauge conduit exposed adjacent the distal end of the inflation tube.

5. An inflation device as defined in claim 4 wherein the inflation tube has venturis for increasing the volume of inflation gas delivered to the airbag and for bleeding excess inflation gas from the airbag to achieve the desired inflation pressure.

6. An inflation device as defined in claim 1 wherein the inflation tube has venturis for increasing the volume of inflation gas delivered to the airbag and for bleeding excess inflation gas from the airbag to achieve the desired inflation pressure.

7. A method of inflating an airbag of the type having an inflation value comprising the steps of:
    A) inserting an inflation tube and input to a pressure gauge through the inflation value of the airbag;
    B) supplying inflation gas from a source through the inflation tube;
    C) monitoring the inflation pressure within the airbag while the inflation tube and an input to the pressure gauge are inserted therein and while inflation gas is being supplied through the inflation tube from the source; and
    D) withdrawing the inflation tube and input to the pressure gauge when the desired inflation pressure is attained;
    wherein the inflation pressure within the airbag is monitored substantially concurrently with inflating the airbag.

8. The method of inflating an airbag defined in claim 7 wherein the inflation tube and input to the pressure gauge are inserted and withdrawn together.

* * * * *